(12) United States Patent
Larsen (10) Patent No.: US 10,830,209 B2
(45) Date of Patent: Nov. 10, 2020

(54) ROTOR LOCK SYSTEM FOR A WIND TURBINE

(71) Applicant: Vestas Wind Systems A/S, Aarhus N. (DK)

(72) Inventor: Gerner Larsen, Hinnerup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 64 days.

(21) Appl. No.: 16/319,408

(22) PCT Filed: Jul. 17, 2017

(86) PCT No.: PCT/DK2017/050243
§ 371 (c)(1),
(2) Date: Jan. 21, 2019

(87) PCT Pub. No.: WO2018/036595
PCT Pub. Date: Mar. 1, 2018

(65) Prior Publication Data
US 2019/0277254 A1    Sep. 12, 2019

(30) Foreign Application Priority Data
Sep. 26, 2016   (DK) ................. 2016 70646

(51) Int. Cl.
*F03D 80/50* (2016.01)
*F03D 7/02* (2006.01)

(52) U.S. Cl.
CPC ......... *F03D 7/0264* (2013.01); *F03D 7/0244* (2013.01); *F03D 7/0268* (2013.01);
(Continued)

(58) Field of Classification Search
None
See application file for complete search history.

(56) References Cited

U.S. PATENT DOCUMENTS 5,463,812 A * 11/1995 Aschenbruck ........ B23P 19/067
29/428
7,340,929 B1 * 3/2008 Christopoulos ....... E05B 27/001
70/337

(Continued)

FOREIGN PATENT DOCUMENTS

DE   202014106254 U1   3/2016
EP       2381092 A2   10/2011

(Continued)

OTHER PUBLICATIONS

European Patent Office, International Search Report and Written Opinion in PCT Application No. PCT/DK2017/050243, dated Oct. 12, 2017.

(Continued)

*Primary Examiner* — Michael Lebentritt
(74) *Attorney, Agent, or Firm* — Wood Herron & Evans LLP (57) ABSTRACT

A locking unit (24) for a rotor lock system (20) of a wind turbine (1), the locking unit (24) comprising: a locking shaft (34) that is slidably movable within a barrel (30) under the influence of an actuator (32); and an angular drive arrangement (48, 50) which is configured to enable angular movement of the locking shaft (34) about a longitudinal axis as the locking shaft (34) is moved linearly within the barrel (30) by the actuator (32).

17 Claims, 8 Drawing Sheets

(52) U.S. Cl.
CPC .......... *F03D 80/50* (2016.05); *F05B 2250/14* (2013.01); *F05B 2260/30* (2013.01); *F05B 2260/301* (2013.01); *Y02E 10/72* (2013.01)

(56) References Cited

U.S. PATENT DOCUMENTS

| | | | |
|---|---|---|---|
| 7,944,079 B1* | 5/2011 | Signore | F03D 15/00 |
| | | | 290/55 |
| 2002/0149205 A1* | 10/2002 | Gilbreth | F01D 25/16 |
| | | | 290/1 R |
| 2010/0021299 A1* | 1/2010 | Aarhus | F03D 80/50 |
| | | | 416/31 |
| 2010/0202884 A1* | 8/2010 | Wedekind | F03D 7/0224 |
| | | | 416/153 |
| 2011/0135481 A1 | 6/2011 | Koronkiewicz | |
| 2011/0138626 A1* | 6/2011 | Tirumalai | F03D 1/0658 |
| | | | 29/889.7 |
| 2014/0010656 A1 | 1/2014 | Nies | |
| 2014/0037456 A1* | 2/2014 | Erno | F03D 80/88 |
| | | | 416/244 R |
| 2016/0032740 A1* | 2/2016 | Niergarth | F01D 7/02 |
| | | | 60/805 |
| 2017/0073068 A1* | 3/2017 | D'Anna | B64C 27/50 |
| 2017/0306930 A1* | 10/2017 | Fenger | F03D 13/10 |
| 2019/0219034 A1* | 7/2019 | Markussen | F03D 80/50 |
| 2019/0345914 A1* | 11/2019 | Thomsen | F03D 80/50 |

FOREIGN PATENT DOCUMENTS

| | | |
|---|---|---|
| EP | 2620637 A1 | 7/2013 |
| EP | 2905467 A1 | 8/2015 |
| EP | 2963287 A1 | 1/2016 |
| GB | 2522796 A | 8/2015 |
| KR | 100821704 B1 | 4/2008 |
| KR | 20130062009 A | 6/2013 |

OTHER PUBLICATIONS

Danish Patent and Trademark Office, Search and Examination Report in PA201670646, dated Feb. 21, 2017.

* cited by examiner

Figure 3 (inset)

RELEASED  LOCKED

ROTOR LOCK SYSTEM FOR A WIND TURBINE

TECHNICAL FIELD

Aspects of the present invention relate to locking systems for wind turbines, and more particularly but not exclusively, to a rotor lock system for a wind turbine.

BACKGROUND

Wind turbines do not run constantly and experience extended periods of downtime for routine maintenance and servicing, emergency repair work, or when the wind speed is simply insufficient to allow operation of the wind turbine. During such extended periods of downtime, it is important to ensure that the rotor blades, and all of the connected components such as the rotor hub and main rotor shaft, are maintained at a complete standstill to avoid any potential injuries or damage to service personnel or maintenance equipment.

Current wind turbines are therefore usually equipped with a rotor brake provided on the rotor shaft that may be used in combination with a rotor lock. Specifically, the rotor brake slows down and effectively halts the movement of the rotor blades, whereupon the rotor lock is then engaged to secure the rotor shaft (and therefore the rotor blades) in a particular position, and thereby prevent further substantial rotation. In some cases, a rotor lock takes the form of a rotor locking disk, which is positioned on or around the rotor shaft relatively close to the hub and rotor blades. The rotor locking disk may be locked in different ways, so as to effectively prevent any further movement of the rotor shaft.

Due to the growing need for clean, renewable energy production, wind turbines and their constituent components are being designed with increasing size and weight. As blade length increases, so does the torque that the blades exert on the main rotor shaft, and also onto the gearbox and generators. It is therefore important to ensure that the rotor locking mechanisms are designed and configured so as to be able to counteract and withstand such large amounts of torque. In addition, the design of the rotor locking mechanism needs to take into account the long-term wear and tear, and strain, that the rotor locking mechanism will be subjected to over the course of the operational lifetime of the wind turbine.

It is against this background that the embodiments of the invention have been devised.

SUMMARY OF THE INVENTION

According to an embodiment of the present invention, there is provided a locking unit for a rotor lock system of a wind turbine. The locking unit comprises a locking shaft that is slidably movable within a barrel under the influence of an actuator. The locking unit also comprises an angular drive arrangement which is configured to enable angular movement of the locking shaft about a longitudinal axis as the locking shaft is moved linearly within the barrel by the actuator.

Advantageously, this enables the locking shaft to be rotated through a variety of orientations about its longitudinal axis so as to facilitate secure engagement with other components in the rotor lock system.

The locking shaft may comprise an engagement portion which is movable away from and towards the barrel for engagement. In some cases, the engagement portion is generally oval in vertical cross-section.

Optionally, the locking shaft comprises a guide portion that slides against a corresponding shaft guide portion of the barrel. The guide portion may be defined by a substantially constant diameter section of the locking shaft which slides within a substantially constant diameter section of the barrel.

Optionally, the angular drive arrangement comprises a helical guide or track formation defined by the barrel and a complementary helical rider or follower formation defined by the locking shaft. Advantageously, engagement between the complementary helical guide and rider formations enables the locking shaft to smoothly and continuously move in an angular manner about its longitudinal axis as it is driven axially within the barrel by the actuator. In some cases, the helical guide formation may comprise at least one helical channel, and the helical rider formation may comprise at least one helical rib or at least one stud or lug projection.

According to another embodiment of the present invention, there is provided a rotor lock system for securing a main rotor shaft of a wind turbine in a substantially stationary position. The rotor lock system comprises a locking unit and a locking disk. The locking unit comprises a locking shaft that is slidably movable within a barrel under the influence of an actuator. The locking unit also comprises an angular drive arrangement which is configured to enable angular movement of the locking shaft about a longitudinal axis as the locking shaft is moved linearly within the barrel by the actuator. The locking disk is associated with the main rotor shaft, and is provided with a plurality of locking apertures. A portion of the locking shaft is configured to be received into a corresponding one of the plurality of locking apertures in a first orientation, and to be rotated within the locking aperture into a second orientation by the angular drive arrangement.

This configuration advantageously ensures that when the locking shaft is inserted into the corresponding locking aperture and rotated, a portion of the locking shaft comes into contact with the locking aperture and effectively prevents further rotational movement of the rotor locking disk, and retains the connected components (for example, the main rotor shaft, the hub and the rotor blades) in a fixed position.

Optionally, the locking shaft is spaced from an internal surface of the respective locking aperture in the first orientation, and contacts the internal surface of the respective locking aperture at one or more contact points in the second orientation. In some cases, the locking shaft may contact the respective locking aperture at two distinct contact points in the second orientation.

This arrangement advantageously ensures that the load on the locking shaft is distributed equally and predictably between these two points. In some cases, the two contact points may be horizontally offset from one another, and the relative positions of the two contact points prevents further rotation of the rotor locking disk, ensuring that it remains securely locked in position. The rotor lock system may comprise at least two locking units arranged around the main rotor shaft. Optionally, a first locking unit contacts a respective first locking aperture at two distinct contact points when in the second orientation, and a second locking unit contacts a respective second locking aperture at a single contact point when in the second orientation. The first and second locking units may be arranged adjacent to one another around the main rotor shaft.

Advantageously, this configuration enables load sharing and distributes the torque on a particular portion of the rotor locking disk across several locking units, thereby decreasing the load on each individual locking unit, whilst ensuring that the main rotor shaft remains securely maintained in a locked position Optionally, the locking apertures are generally rectangular in vertical cross-section. This configuration advantageously allows the generally cylindrical locking shaft to slide into the aperture unobstructed due to the dimensions of its leading edge (i.e. the engagement portion) which means that precise alignment between the locking aperture and the locking shaft is not required.

BRIEF DESCRIPTION OF THE DRAWINGS

One or more embodiments of the invention will now be described, by way of example only, with reference to the accompanying drawings, in which:

FIGS. 6a and 6b show front views of a portion of the rotor lock system embodiment of FIG. 2a, in which FIG. 6a shows the rotor lock system in a 'released' position and FIG. 6b shows the rotor lock system in a 'locked' position;

DETAILED DESCRIPTION

A specific embodiment of the present invention will now be described in which numerous specific features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
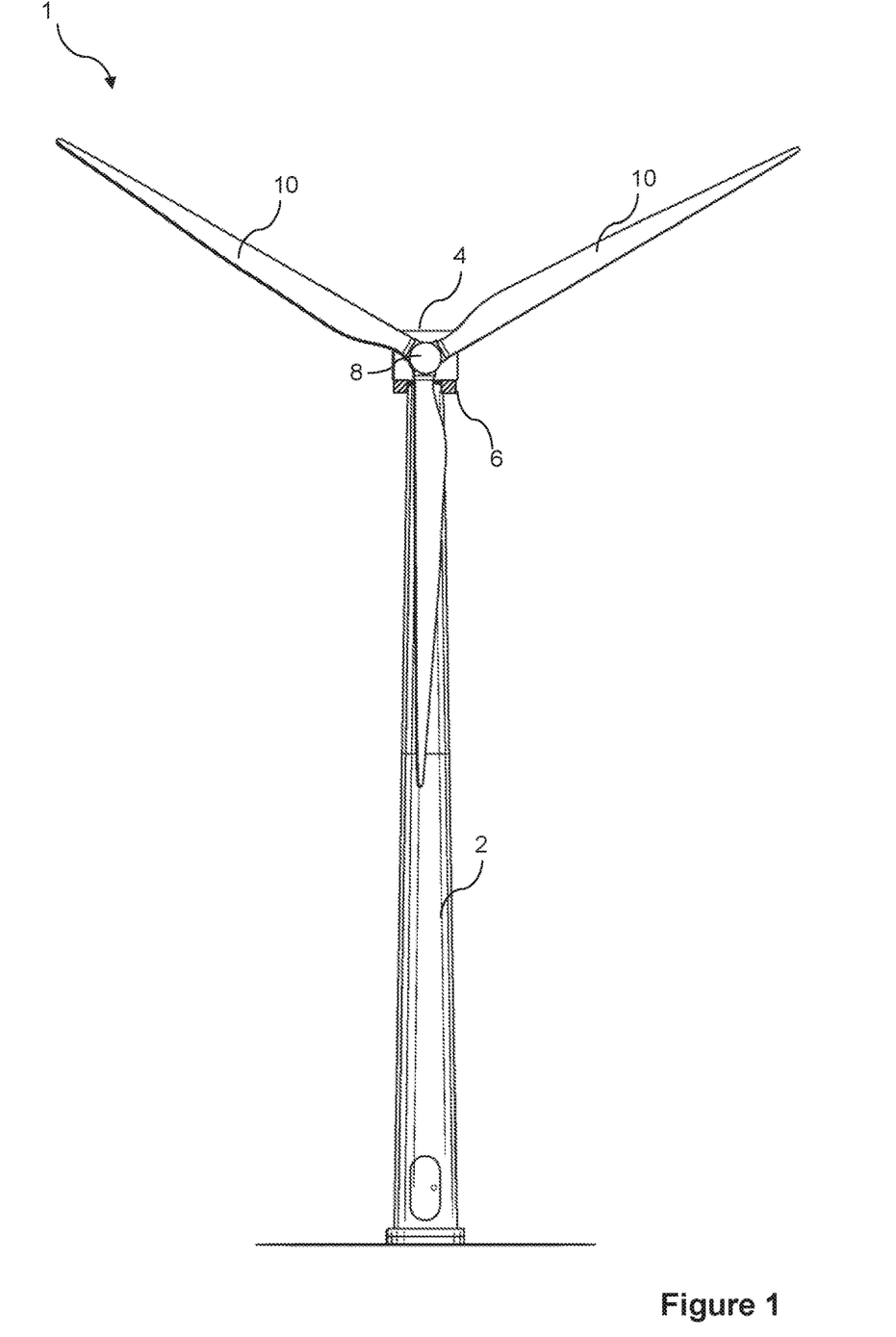
FIG. 1 shows a front view of a typical horizontal axis wind turbine in which a rotor lock system according to an embodiment of the present invention may be implemented.

In order to place the embodiments of the invention in a suitable context, reference will firstly be made to FIG. 1, which illustrates a typical Horizontal Axis Wind Turbine (HAWT) in which a rotor locking system according to an embodiment of the present invention may be implemented. Although this particular image depicts an on-shore wind turbine, it will be understood that equivalent features will also be found on off-shore wind turbines.

The wind turbine 1 comprises a tower 2, a nacelle 4 rotatably coupled to the top of the tower 2 by a yaw system 6, a rotating hub 8 mounted to the nacelle 4 and a plurality of wind turbine rotor blades 10 coupled to the hub 8. The nacelle 4 and rotor blades 10 are turned and directed into the wind direction by the yaw system 6. The nacelle 4 houses all of the generating components of the wind turbine, including the generator, gearbox, drive train and brake assembly, as well as convertor equipment for converting the mechanical energy of the wind into electrical energy for provision to the grid. The nacelle 4 also necessarily contains a main shaft housing (not shown in FIG. 1), which houses a main rotor shaft that is connected at a forward end to the hub 8 and rotor blades 10, and at a rear end to the generating components.

Figures 2A, 2B:
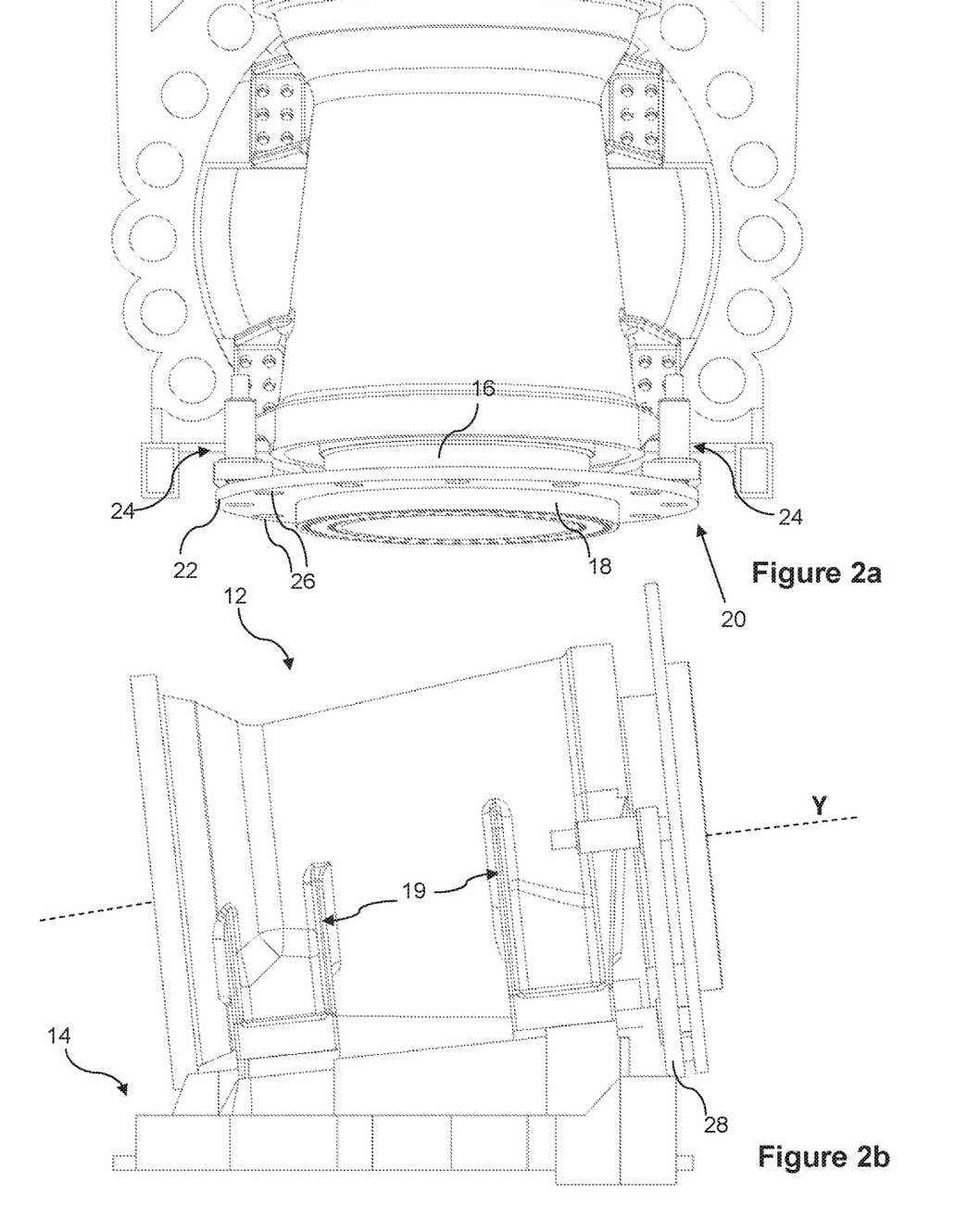
FIGS. 2a and 2b are plan and side-view illustrations respectively of a portion of the wind turbine of FIG. 1, comprising a main shaft housing and a rotor lock system according to an embodiment of the present invention.

FIGS. 2a and 2b show a plan and side view of a main shaft housing 12 of the wind turbine 1, in which the main shaft housing 12 is attached to a load-bearing base frame 14. The base frame provides support to the main shaft housing 12, transmitting the forces from the hub 8 and rotor blades 10 to the wind turbine tower 2. It should be appreciated that, for convenience, the main shaft housing 12 and base frame 14 are shown in isolation here without any of the other generating equipment attached to it.

The main shaft housing 12 rotatably supports a main rotor shaft 16 which is attached to the hub 8 by a hub mounting 18, for example by bolts passing through holes in the hub mounting 18, though it should be noted that the exact means for coupling the shaft to the hub are not shown here for clarity but would be known to the skilled person. The main shaft housing 12 also comprises a front bearing and a rear bearing (both not shown) which are suitable bearings, such as roller bearings, that enable the main rotor shaft 16 to rotate about a longitudinal 'rotor axis' Y. The main shaft housing 12 also comprises a plurality of supporting legs 19 via which the main shaft housing 12 is attached to the supporting base frame 14. The base frame 14 in turn comprises a mounting (not shown) on its underside for interfacing with the yaw system 6 provided in the tower 2.

A rotor lock system 20 according to an embodiment of the present invention is implemented on the main shaft housing 12 and comprises an annular rotor locking disk 22 and a plurality of locking units 24. The rotor locking disk 22 encircles the main rotor shaft 16 and is located ahead of the main shaft housing 12 and directly behind the hub mounting 18. As used herein, the terms 'ahead', 'forward' and 'in front of' refer to a direction along the Y axis that lies proximal to the hub 8 and rotor blades 10; similarly the terms 'behind' or 'rear' refer to a direction along the Y axis that lies distal from the hub 8.

The main rotor shaft 16 is associated with a plurality of locking apertures 26. In this embodiment those apertures 26 are provided at intervals around the circumference of the rotor locking disk 22. Each locking aperture 26 is arranged and configured to receive a portion of a corresponding one of the plurality of locking units 24. Each of the locking units 24 is operated by a hydraulic actuator (not shown) and in use, a moveable portion of each locking unit 24 is urged forward into locking engagement within a respective locking aperture 26. This engagement between the locking units 24 and the rotor locking disk 22 thereby prevents further substantial rotational motion of the main rotor shaft 16 and the connected components.

In the embodiment of FIGS. 2a and 2b, two locking units 24 are provided, one on either side of the main rotor shaft 16. This arrangement ensures that the torque exerted by the rotating main rotor shaft 16 and the associated loading is equally distributed between the two locking units 24, effectively halving the forces exerted on a single locking unit 24 and preventing shearing or uneven wear of a particular locking unit 24.

In the illustrated embodiment, the locking units 24 are mounted in a generally U-shaped support frame or bracket 28 that follows the profile of the rotor locking disk 22, and extends in a semi-circle around the lower portion of the main rotor shaft 16. The support frame 28 may be attached to or otherwise be configured to merge into the outer surface of the main shaft housing 12, although the exact means of attachment of the support frame 28 to the main shaft housing 12 are not shown here.

It will be appreciated by the skilled person that the rotor lock system 20 may comprise more than two locking units 24 and that the locking units 24 may be located at alternative positions around the main rotor shaft 16 than those which are shown in the accompanying figures. It will also be understood that the number, location and shape of the locking apertures 26 provided in the rotor locking disk 22 may vary depending on the exact configuration of the locking units 24 that are used. Such embodiments would constitute minor design variations and are also deemed to fall within the scope of the present invention. Furthermore, the exact shape and configuration of the support frame 28 is not crucial to the operation of the rotor lock system 20, and therefore it will be appreciated that minor design changes that do not affect the function of the support frame 28 will also fall within the scope of the present invention.

The rotor lock system 20 will now be described in greater detail with reference to FIG. 3, which shows a horizontal-cross-sectional view of the main shaft housing 12 and the rotor lock system 20.

Figure 3:
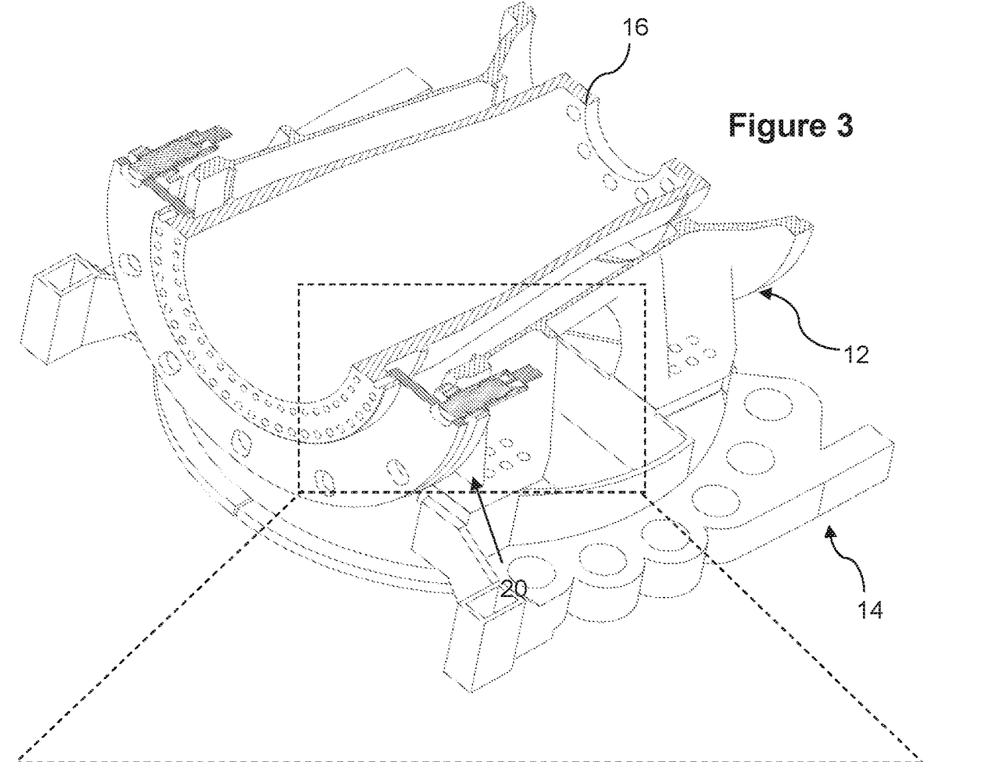
FIG. 3 is a horizontal cross-section view of the wind turbine portion of FIGS. 2a and 2b, and includes a close-up view of details of the rotor lock system as an inset panel.

FIG. 3 also includes an inset panel providing a close-up view of some of the constituent components of the locking unit 24, the configuration of the locking aperture 26, and their relative positions when the rotor lock system 20 is in use.

The locking apertures 26 of the present embodiment are generally rectangular in shape with rounded corners, and penetrate all the way through the thickness of the rotor locking disk 22, thereby extending between front and rear faces of the rotor locking disk 22. Each locking unit 24 comprises a generally cylindrical outer barrel 30, and an actuator 32 that is coupled to a moveable locking pin or shaft 34. In principle, any actuator that is capable causing linear movement is suitable, such as a linear electric actuator, ball screw mechanism, or a hydraulic ram. In this embodiment a hydraulic ram is shown. It will be noted that the actuator 32 is shown in abbreviated form without any hydraulic lines, but the skilled person would understand that the configuration should comprise such additional components as are necessary for the hydraulic actuator to function. Correspondingly sized and shaped slots or holes 35 are also provided in the support frame 28, such that in use each locking unit 24 is securely supported by the support frame 28, whilst the locking pin 34 is urged by the actuator 32 through the holes 35 in the support frame 28 and into locking engagement with the locking apertures 26 of the rotor locking disk 22.

Figure 4A:
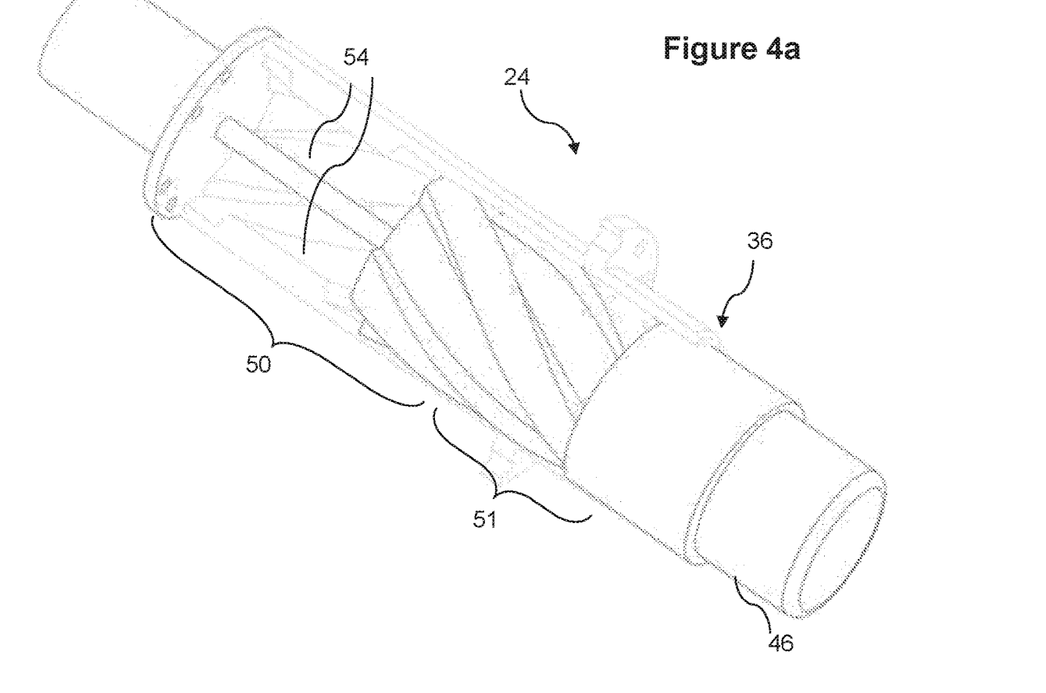
FIGS. 4a and 4b are perspective and exploded perspective views respectively of a locking unit and its associated actuator used in the rotor lock system of FIG. 3.
Figure 4B:
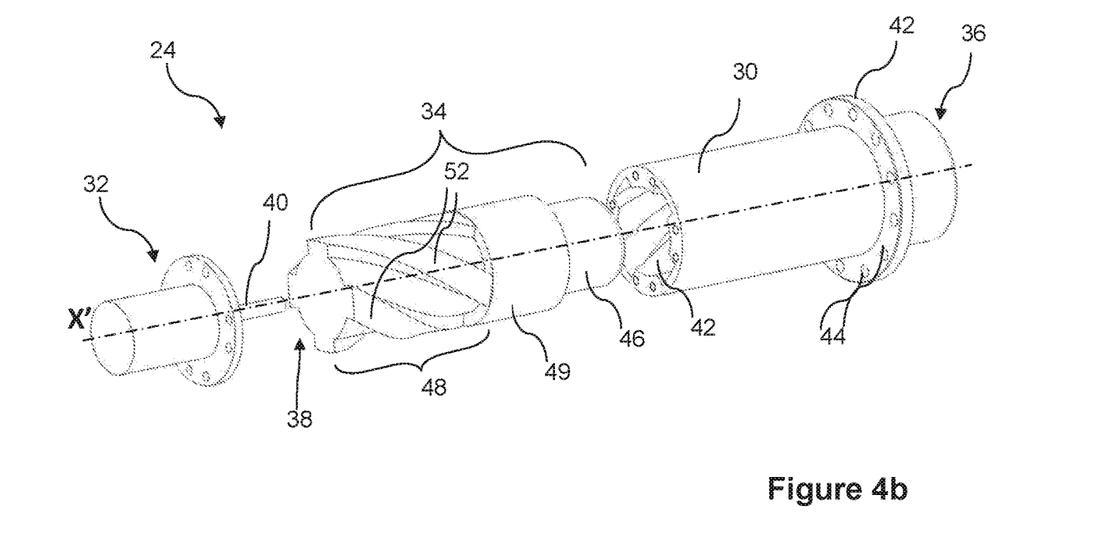

Whereas FIG. 3 shows the rotor lock system 20 associated with the main shaft housing 12 of the wind turbine 1, FIGS. 4a and 4b show the locking unit 24 of the rotor lock system 20 in isolation so that its configuration can be more easily appreciated. FIG. 4a shows the locking unit 24 when it is actuated into a 'locked' position, whilst FIG. 4b shows an exploded view of the locking unit 24 so that its internal configuration can be more easily appreciated.

As previously mentioned, the locking unit 24 comprises a cylindrical-shaped barrel 30 housing a generally cylindrical-shaped locking pin 34 that is moveable relative to the barrel 30. The barrel 30 is closed at a back end by the actuator 32, and open at a front end 36 to allow at least a portion of the locking pin 34 to be extended out of the barrel 30, as may be seen in FIG. 4a. The actuator 32 is coupled to a back end 38 of the locking pin 34, such that linear movement of the actuator 32 is translated to the locking pin 34, thereby enabling reciprocating movement of the locking pin 34 within the barrel 30. An annular mounting flange 42 is provided around a forward portion of the barrel 30, enabling the locking unit 24 to be mounted securely in the support frame 28, for example by bolts passing through holes 44 provided around the circumference of the mounting flange 42, although it will be appreciated that other means of attachment would also be possible.

Now turning to a more detailed description of the locking unit 24, it may be seen that the locking pin 34 itself comprises a locking or engagement portion 46 at its front end, and an angular drive portion 48 at its back end. As will become apparent, the angular drive portion 48 is operable to cause the locking pint 34 to move angularly as it travels linearly along the barrel 30.

The locking portion 46 has a diameter that is smaller than the internal diameter of the barrel 30, thereby allowing the locking portion 46 to be extended out of the front end 36 of the barrel 30 into a locked configuration. The locking pin 34 also comprises a pin or shaft guide portion 49 that has a substantially constant diameter. The pin guide portion 49 may be configured to be integral to the locking pin 34, or it may be designed as a 'collar' feature, depending on the method of manufacture.

The angular drive portion 48 and the pin guide portion 49 of the locking pin 34 each cooperate with complementary regions of the barrel 30. Specifically, an angular guide region 50 is provided on the internal surface of the barrel 30, and cooperates with the angular drive portion 48 of the locking pin 34, causing the locking pin 34 to move angularly about its longitudinal axis X' within the barrel 30 as it is driven axially by the actuator. A pin or shaft guide region 51 is also provided on the internal surface of the barrel 30, and cooperates with the pin guide portion 49 of the locking pin 34. The pin guide region 51 also has a substantially constant diameter, and the external diameters of the pin guide portion 49 and the pin guide region 51 thereby define a sliding fit such that the locking pin 34 moves smoothly along its longitudinal axis 'X'.

The angular drive portion 48 of the locking pin 34 comprises a helical rider or follower formation including a plurality of helical ribs 52 that extend from, and are formed integral to, the back end 38 of the locking pin 34. These helical ribs wrap or curve around the outer surface of the locking pin 34, terminating at and optionally merging into the guide portion 49. The angular guide region 50 of the barrel 30 is provided with a helical guide or track formation comprising channels or flutes 54 that are configured and arranged to receive the helical rider formation (in this case the helical ribs 52) within them when the locking pin 34 is actuated within the barrel 30. The engagement between the helical ribs 52 and the helical channels 54 provides an angular drive arrangement which causes or guides the angular motion of the locking pin 34 within the barrel 30. The linear actuation provided by the actuator 32 is thereby converted into a combination of linear and rotational motion of the locking pin 34 within the barrel 30, such that the locking pin 34 moves angularly about its longitudinal axis X' within the barrel as it is driven axially by the actuator 32.

The illustrated embodiment of FIGS. 4a and 4b comprises four helical ribs 52 arranged such that the points on the back end 38 of the locking pin 34 from which each helical rib 52 extends are separated by around 90 degrees. However, it will be appreciated that the number and configuration of the helical ribs 52 may be varied depending on the desired functionality of the locking unit 24. Furthermore, it will be appreciated that the shape of the helical guide and helical rider formations may be altered to facilitate different degrees of angular motion (or even allow for an initial non-rotating movement of the locking shaft). In addition, it will also be appreciated that the helical ribs 52 and the helical channels 54 may be replaced by other components or alternative configurations, as long as the angular motion of the locking pin 34 within the barrel 30 is still enabled. For example in another embodiment, the function of the helical ribs may instead be carried out by discrete projections, such as a stud or lug, that run or are guided along the helical channels.

Figure 5:
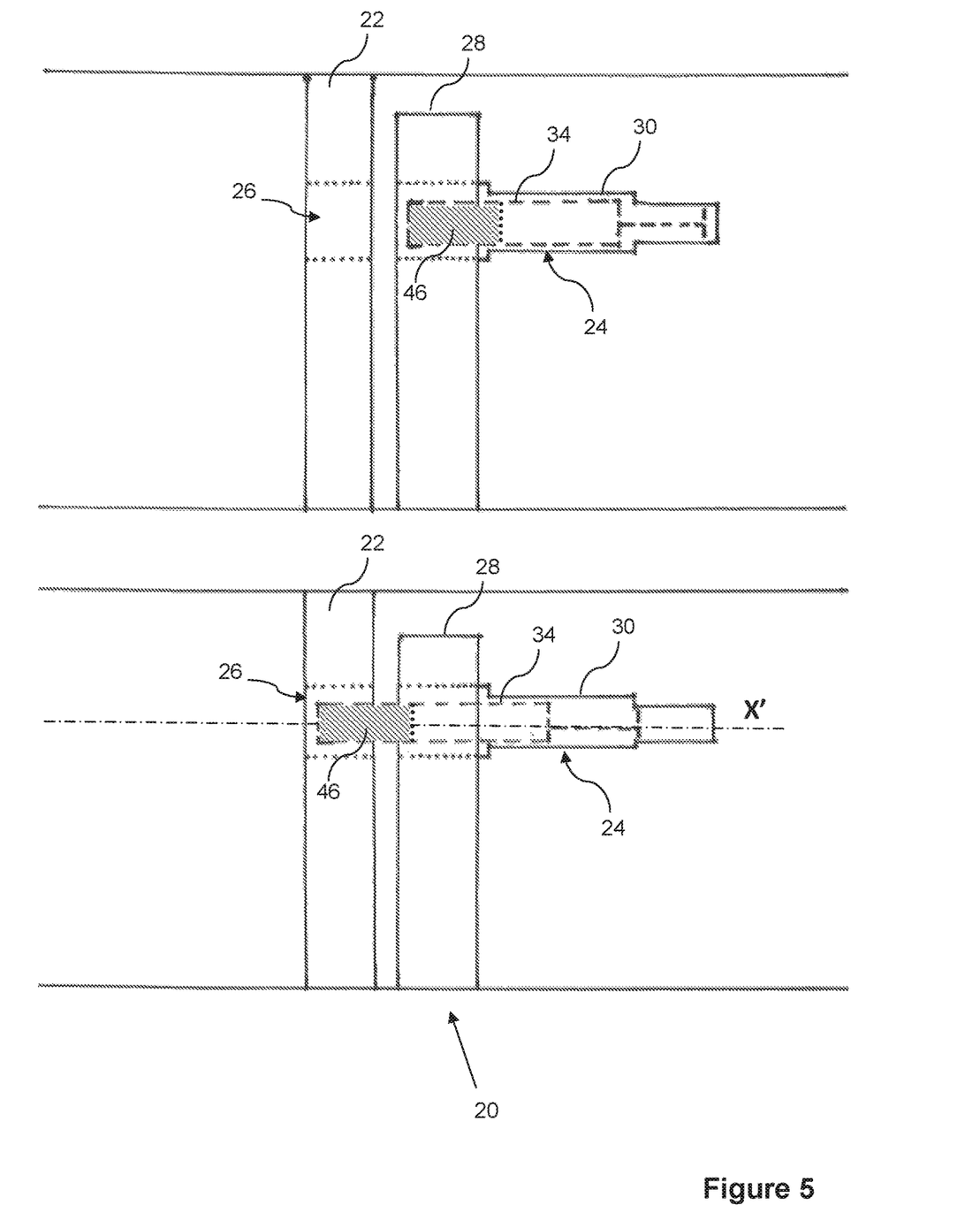
FIG. 5 is a schematic diagram illustrating the movement of parts of the rotor lock system between a 'locked' position and a 'released' position according to an embodiment of the present invention.

FIG. 5 shows two line drawings of the rotor lock system 20 in a side-on view, with the locking unit 24 provided in its support frame 28, and illustrating the relative positions of the locking pin 34 and the rotor locking disk 22 when the locking pin 34 is in a 'released' configuration (the upper image) and in a 'locked' configuration (the lower image).

In the released configuration, the majority of the locking pin 34 remains retracted within the barrel 30 and the locking portion 46 does not protrude beyond a front surface of the support frame 28 (the surface closest to the rotor locking disk 22). The rotor locking disk 22 and the main rotor shaft 16 are therefore free to rotate. In the locked configuration, the locking pin 34 is actuated along its longitudinal axis X', towards the rotor locking disk 22, by the hydraulic actuator (not shown). The forward actuation thereby results in the locking portion 46 entering a corresponding one of the locking apertures 26 in the rotor locking disk 22. The engagement between the locking portion 46 and the locking aperture 26 prevents any further rotational movement of the rotor locking disk 22 and the main rotor shaft 16.

It is noted that the locked configuration is preferably only implemented when the main rotor shaft 16 has come to a complete standstill, and the locking apertures 26 in the rotor locking disk 22 are substantially aligned with the respective locking units 24. This provides a secure means of retaining the main rotor shaft 16 in a desired position, whilst preventing any damage being caused to the rotor lock system 20 due to shearing that would result from excessive rotational forces from the main rotor shaft 16.

Figure 6A:
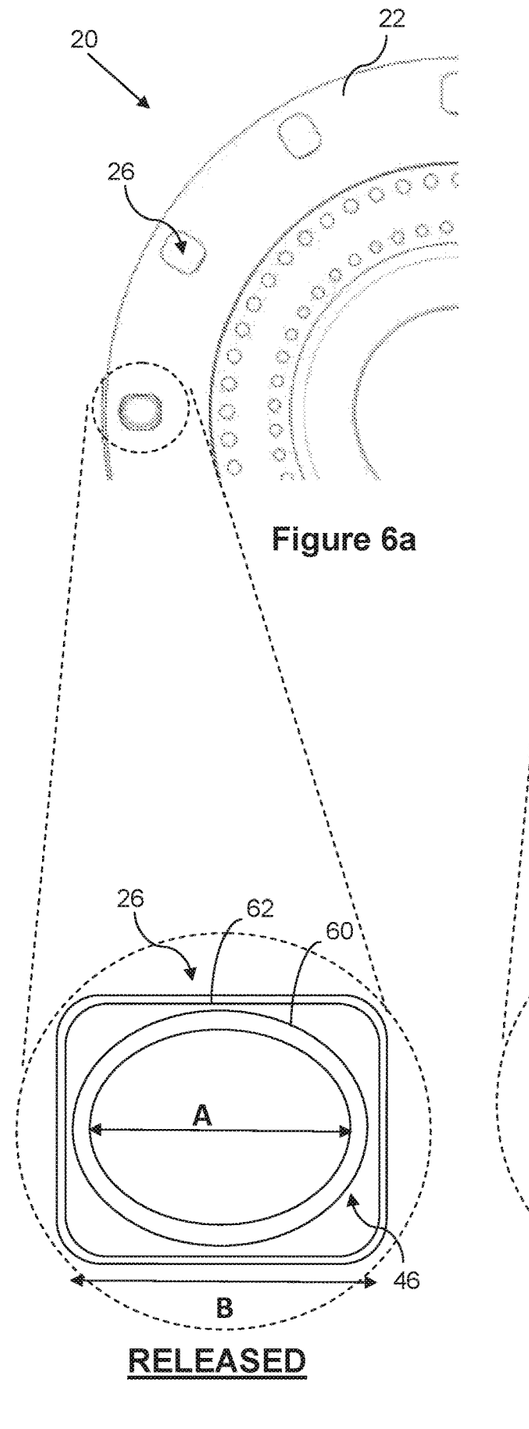
Figure 6B:
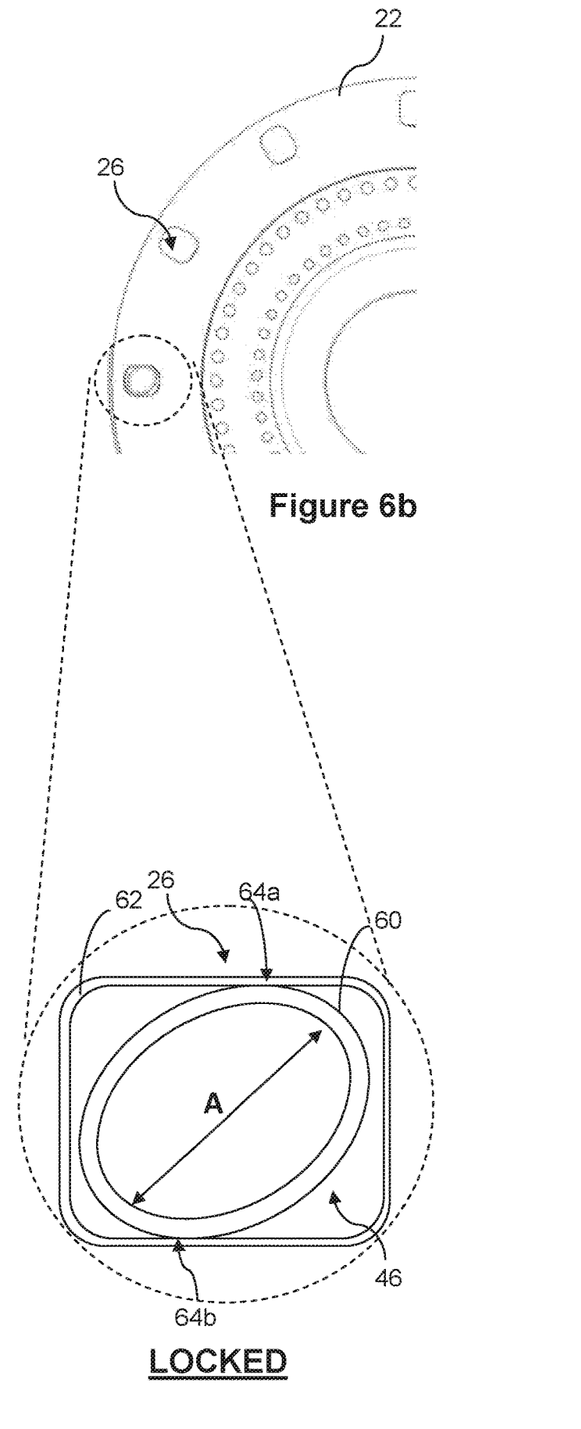

FIGS. 6a and 6b show a portion of the front surface of the rotor locking disk 22. Specifically, the two figures illustrate the rotor lock system 20 in a released configuration (FIG. 6a) and a locked configuration (FIG. 6b). Close-up views of the two configurations are shown in the inset panels for added clarity.

When viewed in vertical cross-section along the plane of the rotor locking disk 22, it can be seen that the locking portion 46 of the locking pin 34 is generally elliptical or oval in cross section with a major axis A. The corresponding locking aperture 26 is generally rectangular in shape with rounded corners and a long edge B. In the released configuration, the locking portion 46 is oriented such that its major axis A is substantially parallel to the long edge B of the locking aperture 26. In this orientation, the long edge B of the aperture 26 is longer than the length of the locking pin along its major axis A. Due to the relative sizes and shapes of the locking portion 46 and the locking aperture 26, an external surface 60 of the locking portion 46 is therefore spaced from an internal surface 66 of the locking aperture 26, such that no part of the locking portion 46 is in contact with the locking aperture 26.

In the locked configuration, the locking portion 46 has been rotated such that its major axis A is oriented at a roughly 45 degree angle to the long edge B of the locking aperture 26. As a result, the external surface 60 of the locking rod 46 contacts the internal surface 62 of the locking aperture 26 at two points 64a, 64b. As can be seen, the two contact points 64a, 64b are horizontally offset from one another. The relative positions of the two contact points 64a, 64b prevent further rotation of the rotor locking disk 22, and hence ensure that the rotor locking disk 22 remains securely locked in position.

As previously mentioned, the rotation of the locking portion 46 within the respective locking aperture 26 is facilitated by the angular drive arrangement 48, 50 of the locking unit 24, and particularly results from the cooperation between the helical channels 54 in the barrel 30 and the helical ribs 52 on the locking pin 34, which causes the locking pin 34 to move angularly about its longitudinal axis as it is driven forward into the locking aperture 26. As the locking pin 34 moves into the locked position, thereby contacting its corresponding aperture 26 at two points 64a, 64b, it will be appreciated that the load on the pin is distributed equally and predictably between these two points. Furthermore, the locking pin 34 is able to slide into the aperture unobstructed due to the dimensions of its leading edge (i.e. the locking portion 46) which means that precise alignment between the locking aperture and the locking pin is not required.

Figure 7:
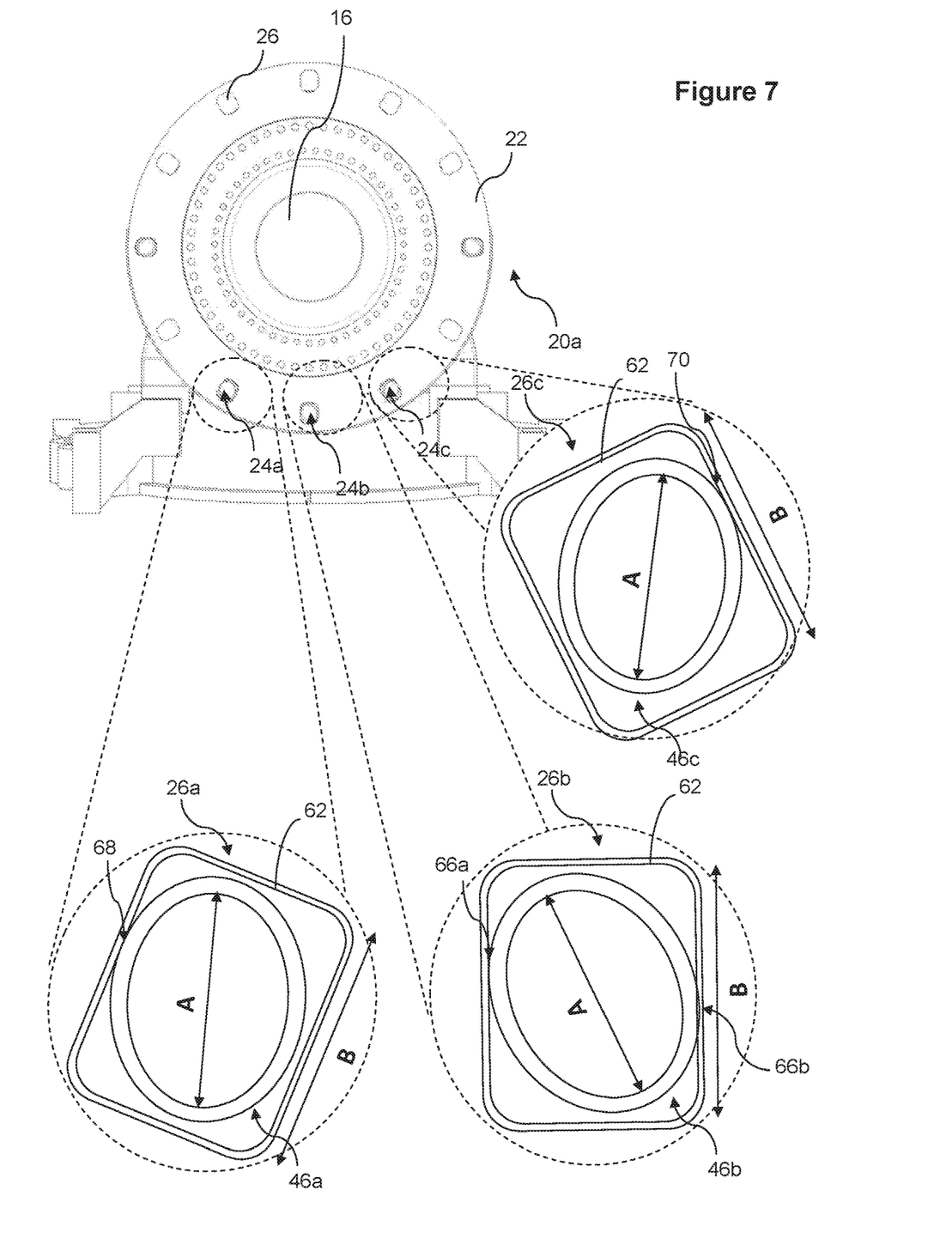
FIG. 7 is an end view of the rotor lock system implemented on the main rotor shaft of a wind turbine according to another embodiment of the present invention.

FIG. 7 shows a front view of the main shaft housing 12 of the wind turbine 1, on which a rotor lock system 20a according to another embodiment of the present invention is implemented. The inset of FIG. 7 provides a close-up view of a portion of the rotor lock system 20a when it is in a 'locked' configuration.

Whereas the embodiment of the previous figures involved the use of only two locking units 24, which were provided on opposite sides of the main rotor shaft 16 so as to balance the torsional forces exerted by the main rotor shaft 16 via the rotor locking disk 22, the embodiment of FIG. 7 includes three additional locking units 24a, 24b, 24c provided adjacent to one another below the main rotor shaft 16. It should be appreciated that the horizontally opposed locking units 24 may be omitted in this embodiment.

The locking units 24a, 24b, 24c of this embodiment are designed and configured to be very similar to those of the previous embodiment, and to operate in substantially the same manner, as was described earlier with reference to FIGS. 4 to 6. Briefly, each locking unit 24a, 24b, 24c comprises a locking pin 34 that is moveable within a barrel 30 by an actuator 32, the locking pin 34 comprising an angular drive portion 48 that is configured to cooperate with an angular guide portion 50 in the barrel 30. The cooperation between these two complementary portions 48, 50 enables the locking pin 34 to move angularly about its longitudinal axis within the barrel 30 as it is driven axially by the actuator 32. Each locking pin 34 also comprises a locking portion 46a, 46b, 46c that may be extended into one of the locking apertures 26a, 26b, 26c on the rotor locking disk 22. To avoid unnecessary repetition, the following description will now focus on the differences between the two embodiments, in particular the interplay between the three additional locking units 24a, 24b, 24c.

The three additional locking units 24a, 24b, 24c are positioned below the main rotor shaft 16 and arranged at suitable intervals so as to be insertable into respective locking apertures 26a, 26b, 26c. In the illustrated embodiment, these locking apertures 26a, 26b, 26c are located adjacent to one another. It will be noted that it would be possible to implement this embodiment as an extension to the previous embodiment pictured in FIGS. 2a and 2b, as the additional locking units 24a, 24b, 24c may be mounted in the support frame 28 which follows the profile of the rotor locking disk 22 in a U-shape that extends around the lower half of the main rotor shaft 16.

As may be seen from the inset panels of FIG. 7, when in the locked configuration, each of the three additional locking portions 46a, 46b, 46c is oriented at a different angle within its respective locking aperture 26a, 26b, 26c. Furthermore, depending on the location of the locking unit 24a, 24b, 24c, the locking portions 46a, 46b, 46c may contact the internal surfaces 62 of the respective locking apertures 26a, 26b, 26c at either one or two contact points. As may be seen from FIG. 7, the locking portion 46b of the central locking unit 24b contacts its locking aperture 26b at two contact points 66a, 66b, whilst the locking portions 46a, 46c of the two adjacent locking pins 24a, 24c each contact their respective locking apertures 26a, 26c at a single contact point 68, 70. The left-most locking unit 24a is offset slightly to the left of its corresponding locking aperture 26a, whilst the right-most locking unit 24c is offset slightly to the right of its corresponding locking aperture 26c. The angular distances between the central locking unit 24b and its two adjacent locking units 24a, 24c, are therefore slightly greater than the angular distances between central locking aperture 26b and its two adjacent locking apertures 26a, 26c.

This arrangement of locking units 24a, 24b, 24c is beneficial for load sharing. Due to the size and weight of the main rotor shaft 16 and its connected components, the amount of torque exerted on the locking units 24a, 24b, 24c via the rotor locking disk 22 is enormous. This can result in shearing or uneven wear of the locking units 24a, 24b, 24c in cases where large amounts of torque and loading are concentrated on only one or two locking units 24a, 24b, 24c, which is undesirable. The embodiment of FIG. 7 enables load sharing and distributes the torque on a particular portion of the rotor locking disk 22 across several locking units 24a, 24b, 24c, thereby decreasing the load on each individual locking unit 24a, 24b, 24c, whilst ensuring that the main rotor shaft 16 remains securely maintained in a locked position.

Many modifications may be made to the above examples without departing from the scope of the present invention as defined in the accompanying claims.

For example, different numbers or configurations of locking units 24 and locking apertures 26 may be utilised. Alternatively or additionally, the locking units 24 may be located at different points around the main rotor shaft 16, and the positions of the locking apertures 26 may be varied accordingly. Furthermore, the shapes of the locking portions 46 of the locking pins 34, as well as the shapes of the locking apertures 26 may also be varied. Such minor alterations are deemed to fall within the scope of the present invention provided the required locking effect is maintained.

Figure 8:
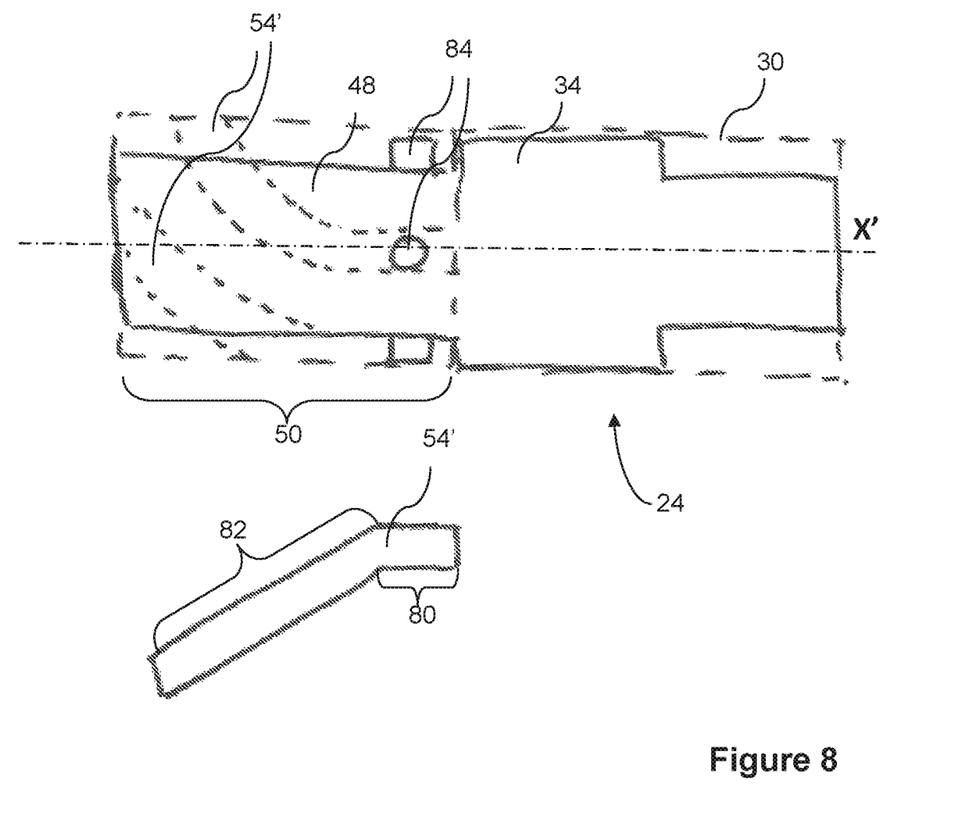
FIG. 8 is a schematic view of a locking unit in accordance with another embodiment of the invention.

FIG. 8 shows a schematic diagram of the locking unit 24 according to another embodiment, which incorporates a minor modification that facilitates an initial non-rotating movement of the locking pin 34. As with the previous embodiments, the locking unit 24 comprises an angular drive arrangement (48, 50) configured to control the movement of the locking shaft within the barrel, which arrangement comprises an angular drive portion 48 provided on the locking pin 34, and an angular guide portion 50 provided on the barrel 30.

As with the embodiment shown in FIG. 4a, the angular guide portion 50 comprises a plurality of channels or flutes 54'. However, each of the channels 54' has been modified to include an initial generally linear or straight section 80 (at a rearmost portion of the angular guide portion 50) which is generally parallel to the longitudinal axis X' of the locking shaft. The straight section 80 of the channel 54' subsequently transitions smoothly into a curved or helical section 82. A planar view of one of the modified channels 54' is shown below the schematic diagram of the locking pin, and is intended to illustrate the modified channel 54' configuration separate ('unwrapped') from the cylindrical surface of the barrel 30. In addition, in this embodiment, the helical ribs 52 of FIG. 4a have been replaced by studs or lugs 84, each of which is sized and configured to be received in a corresponding one of the channels 54'. It will be appreciated that the lugs 84 need not replace the helical ribs 52 like-for-like—a single lug 84 would be sufficient to guide the movement of the locking pin 34.

Each lug 84 moves within its corresponding channel 54' when the locking pin 34 is driven axially by the actuator. The engagement of the lugs 84 within their respective modified channels 54' results in an initial non-rotating movement of the locking pin 34 (generally parallel to its longitudinal axis X') as the lugs 84 are guided along the straight section 80 of the channels 54'. This is followed by an angular movement of the locking pin 34 about its longitudinal axis X', as the lugs 84 are guided along the curved section 82 of the channels 54'.

This initial non-rotating movement of the locking pin 34 advantageously allows the locking portion 46 of the locking pin 34 to enter the corresponding locking aperture 26 on the rotor locking disk 22 in an non-rotated configuration, and to be subsequently rotated into a locked configuration, together with further forward motion, such that locking portion 46 contacts the internal surfaces of the locking apertures 26.

It will be appreciated that an initial non-rotating movement of the locking pin 34 may also be facilitated by altering the shape or length of the helical channels 54 in the embodiments of FIGS. 4a and 4b. For example, the helical channels 54 in the angular guide region 50 of the barrel 30 may not extend all the way to the rear of the barrel 30, such that the helical ribs 52 are not immediately engaged within the helical channels 54 upon actuation of the locking pin 34. This would result in the locking pin 34 initially sliding axially in a non-rotating manner, and only commencing angular movement when the helical ribs 52 are engaged within the helical channels 54.

The invention claimed is:

1. A locking unit for a rotor lock system of a wind turbine, the locking unit comprising:
   a locking shaft that is slidably movable within a barrel under the influence of an actuator; and
   an angular drive arrangement which is configured to enable angular movement of the locking shaft about a longitudinal axis as the locking shaft is moved linearly within the barrel by the actuator.

2. The locking unit according to claim 1, wherein the locking shaft comprises an engagement portion which is movable away from and towards the barrel for engagement.

3. The locking unit according to claim 2, wherein the engagement portion is generally oval in vertical cross-section.

4. The locking unit according to claim 1, wherein the locking shaft comprises a guide portion that slides against a corresponding shaft guide portion of the barrel.

5. The locking unit according to claim 4, wherein the guide portion is defined by a substantially constant diameter section of the locking shaft which slides within a substantially constant diameter section of the barrel.

6. The locking unit according to claim 1, wherein the angular drive arrangement comprises a helical guide formation defined by the barrel and a complementary rider formation defined by the locking shaft.

7. The locking unit according to claim 6, wherein the helical guide formation comprises at least one helical channel.

8. The locking unit according to claim 6, wherein the helical rider formation comprises any combination of the following: at least one helical rib, and at least one stud.

9. A rotor lock system for securing a main rotor shaft of a wind turbine in a substantially stationary position, the rotor lock system comprising:
  a locking unit according to claim 1; and
  a locking disk, associated with the main rotor shaft, and provided with a plurality of locking apertures;
  wherein a portion of the locking shaft is configured to be received into a corresponding one of the plurality of locking apertures in a first orientation, whilst being rotated within the locking aperture into a second orientation by the angular drive arrangement.

10. A rotor lock system according to claim 9, wherein the locking shaft is spaced from an internal surface of the respective locking aperture in the first orientation, and contacts the internal surface of the respective locking aperture at one or more contact points in the second orientation.

11. The rotor lock system according to claim 10, wherein the locking shaft contacts the internal surface of the respective locking aperture at two distinct contact points in the second orientation.

12. The rotor lock system according to claim 9, comprising at least two locking units arranged around the main rotor shaft.

13. The rotor lock system according to claim 12, wherein a first locking unit contacts a respective first locking aperture at two distinct contact points when in the second orientation, and a second locking unit contacts a respective second locking aperture at a single contact point when in the second orientation.

14. The rotor lock system according to claim 13, wherein the first and second locking units are arranged adjacent to one another around the main rotor shaft.

15. The rotor lock system according to claim 9, wherein each of the locking apertures is generally rectangular in vertical cross-section.

16. A wind turbine comprising a tower, a nacelle rotatably coupled to the top of the tower by a yaw system, a rotating hub mounted to the nacelle and a plurality of wind turbine rotor blades coupled to the hub;
  wherein said wind turbine further comprises a rotor lock system according to claim 9.

17. The locking unit according to claim 1, wherein the actuator is capable of only linear displacements.

* * * * *